(12) United States Patent
Olsson et al.

(10) Patent No.: US 10,320,497 B2
(45) Date of Patent: Jun. 11, 2019

(54) CONTROL OF DIRECTIVE ANTENNAS FOR WIRELESS LINKS

(71) Applicant: TELEFONAKTIEBOLAGET LM ERICSSON (PUBL), Stockholm (SE)

(72) Inventors: Bengt-Erik Olsson, Hovås (SE); Christina Larsson, Mölndal (SE); Mats Rydström, Billdal (SE); Jonas Hansryd, Göteborg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/105,667

(22) PCT Filed: Jan. 16, 2014

(86) PCT No.: PCT/EP2014/050803
§ 371 (c)(1),
(2) Date: Jun. 17, 2016

(87) PCT Pub. No.: WO2015/106813
PCT Pub. Date: Jul. 23, 2015

(65) Prior Publication Data
US 2016/0323047 A1     Nov. 3, 2016

(51) Int. Cl.
*H01Q 3/02*     (2006.01)
*H04B 7/06*     (2006.01)
(Continued)

(52) U.S. Cl.
CPC ............... *H04B 17/21* (2015.01); *H01Q 3/02* (2013.01); *H04B 7/0617* (2013.01); *H04B 7/084* (2013.01);
(Continued)

(58) Field of Classification Search
CPC .......... H04B 7/02; H04B 7/024; H04B 7/026; H04B 7/028; H04B 7/04; H04B 7/0404;
(Continued)

(56) References Cited

U.S. PATENT DOCUMENTS 6,453,177 B1 *   9/2002   Wong ..................... H01Q 1/246
                                                                           455/450
8,457,026 B1 *   6/2013   Ho ....................... H04B 7/0617
                                                                            342/359

(Continued)

FOREIGN PATENT DOCUMENTS

EP         1 976 149 A1     10/2008
EP         2 498 414 A1     9/2012
WO     WO 2013/023226 A1     2/2013

OTHER PUBLICATIONS

Hansryd, et al. Non-line-of-sight microwave backhaul for small cells Non-line-of-sight microwave backhaul for small cells. Ericsson Review, Feb. 22, 2013 (Feb. 22, 2013).

*Primary Examiner* — Young T Tse

(57) ABSTRACT

The present disclosure relates to a radio receiver, a radio transmitter, and methods for evaluating receive and transmit antenna patterns of directive payload antennas. The method for evaluating receive antenna patterns of a directive payload antenna comprises the step of steering a probing signal receive pattern of a steerable receive pattern antenna according to a pre-determined sequence of probing signal receive patterns, and receiving a probing signal via the steerable receive pattern antenna, as well as determining a probing signal quality value from the received probing signal as a function of the pre-determined sequence of probing signal receive patterns.

27 Claims, 7 Drawing Sheets

(51) Int. Cl.
*H04B 7/08* (2006.01)
*H04B 17/21* (2015.01)
*H04W 16/28* (2009.01)
*H04W 52/24* (2009.01)

(52) U.S. Cl.
CPC .......... *H04B 7/086* (2013.01); *H04B 7/0825* (2013.01); *H04W 16/28* (2013.01); *H04W 52/241* (2013.01)

(58) Field of Classification Search
CPC ...... H04B 7/0413; H04B 7/0452; H04B 7/06; H04B 7/0613; H04B 7/0617; H04B 7/0632; H04B 7/08; H04B 7/0825; H04B 7/084; H04B 7/0857; H04B 7/086; H04B 7/10; H04B 17/10; H04B 17/12; H04B 17/20; H04B 17/21; H04B 17/309; H01Q 3/02; H04W 16/28; H04W 52/24; H04W 52/241
USPC ....... 375/130, 133, 135, 136, 141, 146, 147, 375/224–226, 259, 260, 267, 299, 347; 342/82, 89, 359–363, 367, 368; 343/725, 343/729, 737, 751; 455/39, 500, 502, 455/503, 513, 63.4, 67.13, 67.14, 73, 88, 455/553.1, 101, 132, 134, 135
See application file for complete search history.

(56) References Cited

U.S. PATENT DOCUMENTS

| | | | |
|---|---|---|---|
| 2002/0106042 A1* | 8/2002 | Yu | H04B 7/086 375/347 |
| 2002/0160737 A1* | 10/2002 | Crawford | H04B 7/0811 455/272 |
| 2003/0002471 A1* | 1/2003 | Crawford | H04B 17/336 370/343 |
| 2007/0135051 A1* | 6/2007 | Zheng | H04B 7/18563 455/63.1 |

* cited by examiner

CONTROL OF DIRECTIVE ANTENNAS FOR WIRELESS LINKS

TECHNICAL FIELD

The present disclosure relates to a radio transmitter, a radio receiver, and methods for evaluating transmit and receive antenna patterns of directive payload antennas.

BACKGROUND

A point-to-point radio link is a wireless transceiver system for point-to-point radio communication between two fixed sites. Radio links are commonly used for backhaul in cellular networks, i.e., for connecting network units such as base stations to a core network.

Traditional radio links are often based on microwave transmission, and are as a rule deployed in line-of-sight, LOS, conditions. By LOS condition is meant that a clear line of sight between the two fixed transceiver sites exist, thus the propagation path over which wireless signals propagate is not obscured or blocked by obstacles. The opposite, i.e., when the transmission path is obscured or blocked, and where radio propagation is via diffraction and/or reflection, is referred to as a non-line-of-sight, NLOS, condition.

Radio link transceivers are often used together with highly directive antennas, e.g., disc or horn antennas. Consequently, antenna alignment is an important aspect of radio link deployment, since an erroneous antenna alignment will have an adverse effect on system gain.

An antenna is always associated with an antenna pattern, which in case of a transmit antenna describes the gain of electromagnetic radiation that is emitted in a given direction, and in case of a receive antenna the gain of electromagnetic radiation that is received from a given direction. Reciprocity often holds, meaning that the transmit and receive antenna patterns are often substantially equal in shape. In short, the antenna pattern describes the gain of an antenna as a function of direction (elevation and azimuth).

Herein, both transmit and receive antenna patterns are defined with respect to a global coordinate system, meaning that the antenna pattern changes when the position and/or direction of the physical antenna is changed.

As an example, consider a disc antenna with a single antenna main lobe or beam. When the antenna is deployed, the antenna pattern of this disc antenna essentially describes the direction (elevation and azimuth) and width of the main lobe with respect to a global coordinate system, i.e., not relative to the antenna itself. A change in the direction in which the disc antenna points results in a change of the antenna pattern. An optimization of the antenna pattern of the disc antenna amounts to finding the best direction in which to physically point the main lobe of the disc antenna.

Antenna alignment, i.e., setting the direction (elevation and azimuth) and shape of the antenna transmit and/or receive pattern, is an important aspect of radio link deployment. This is true both when deploying traditional LOS radio links, and also when deploying the more recently developed NLOS type of radio links which do not require a clear line of sight between transceivers. Current alignment procedure is often based on a manual first coarse visual alignment towards a well-known reference point, e.g., a street corner, a roof edge, or the wall of a building, followed by alignment using instrumentation for maximizing a received signal strength or similar.

Once antennas of the radio link have been aligned with respect to each other, i.e., the corresponding antenna transmit and receive patterns have been directed in favorable directions for communication, the alignment is often locked in place and not changed for the remainder of the life-span of the link, unless some rare event occurs which prompts a re-alignment of either or both ends of the radio link. Such rare events may include, e.g., a re-planning of the backhaul network layout, or an exchange of radio link hardware.

In an urban NLOS communication environment there are often multiple possible propagation paths for radio signals between two sites, due to many existing combinations of reflection and diffraction points. This is today used in, e.g., mobile broadband networks to secure connections by utilizing wide beam antennas together with orthogonal frequency division multiplexing, OFDM, and multiple-input multiple-output, MIMO, technologies. However, for high performance point-to-point radio links, antennas having narrow beam antenna patterns are needed in order to maximize energy transfer over the channel, which is needed in order to fulfill the strict requirements on radio performance often posed on this type of communication system.

A problem then, is that it is often difficult to manually choose the best path, or combination of paths, during deployment and initial alignment of an NLOS point-to-point radio link.

During NLOS communication, obstacles in urban environments are utilized for propagation using diffraction and/or reflection. However, the environment may change over time and is out of the control of the radio link operator. As an example, reflection in a building wall may provide different performance when, e.g., windows open or close, or if new objects appear such as signs, sun shades etc. Such events may cause the reflected or diffracted radio signal to change direction and as a consequence the communication system using the NLOS channel may suffer degraded performance.

Thus, another problem is that NLOS radio links cannot be expected to exhibit the same degree of stability in terms of propagation conditions as for the traditional type of LOS microwave links where antenna alignment is often only done once during deployment of the radio link. Existing NLOS radio link installations cannot, and will not, adapt its antenna alignment to changing propagation conditions, and may therefore suffer a performance degradation if the surrounding environment changes.

The problems noted above are especially pronounced for point-to-point radio links, but are not limited to point-to-point radio link communication systems. Hence, similar problems are present in many types of communication systems.

SUMMARY

An object of the present disclosure is to provide a radio transmitter, a radio receiver, and methods which seek to mitigate, alleviate, or eliminate one or more of the above-identified deficiencies in the art and disadvantages singly or in any combination and to provide improved means for communication in NLOS environments.

This object is obtained by a method in a radio receiver for evaluating the receive pattern of a directive payload antenna. The method comprises the step of steering a probing signal receive pattern of a steerable receive pattern antenna according to a pre-determined sequence of probing signal receive patterns. The method further comprises the step of receiving a probing signal via the steerable receive pattern antenna, and also determining a probing signal quality value from the received probing signal as a function of the pre-determined sequence of probing signal receive patterns.

Thus, the suitability of different antenna receive patterns for use in radio communication in a given environment can be continuously evaluated, which is an advantage.

Another advantage is that a pre-determined sequence of probing signal receive patterns is used. This allows a user to set the pre-determined sequence of probing signal receive patterns to a sequence of probing signal receive patterns which all fulfill certain conditions, i.e., which only yield a specific range of receive angles. Thus, the pre-determined sequence of probing signal receive patterns can be set according to, e.g., governmental regulation or other objectives before deployment of the system or during operation.

Yet another advantage is that a probing signal is used for evaluation of receive patterns, thus the evaluation can be done independently from reception of other signals, such as a payload signal.

According to an aspect, the method further comprises the step of receiving a payload signal in parallel with receiving the probing signal. The payload signal is independent of and separated from the probing signal.

It is advantageous that the probing signal is independent of the payload signal for many reasons. One reason is that said feature of having independent payload and probing signals implies that the probing signal can be controlled and steered at will without risking the performance of the payload signal. Another reason is that a communication system adapted for transmission and reception of the payload signal can be used as is, and does not have to be changed in order to accommodate the present teaching.

According to an aspect, the step of determining further comprises synchronizing the steered sequence of probing signal receive patterns to a predetermined sequence of probing signal transmit patterns used for transmission of the probing signal by a radio transmitter. The step of determining here also comprises determining a probing signal quality value from the received probing signal as a function of a combination of probing signal transmit and receive patterns.

Consequently, combinations of receive and transmit antenna patterns can be evaluated based on the determined probing signal quality value. This is advantageous since the result of the evaluation of a given probing signal receive pattern can be expected to depend on which probing signal transmit pattern that is currently in use. In this way, different paths through the environment in which the radio receiver is deployed are evaluated, which is an advantage.

According to another aspect, the step of synchronizing further comprises detecting a data signal comprised in the probing signal by demodulating the received probing signal.

By the feature of detection of a data signal comprised in the probing signal, a communications link is established between the radio transmitter and the radio receiver, which is advantageous since information can pass between the radio transmitter and the radio receiver via the data signal independently of any other means of communication, such as a payload signal passing between the radio transmitter and the radio receiver. Thus, other means of communication remain unaffected by the communications link via the data signal, which is an advantage.

According to yet another aspect, the detected data signal comprises a synchronization word indicating the start in time of the sequence of probing signal transmit patterns used by the radio transmitter.

According to a further aspect, the detected data signal comprises the probing signal transmit pattern currently used for transmission of the probing signal by the radio transmitter.

Thus, means for synchronization between radio transmitter and radio receiver of the antenna diagrams in use is provided independently of any other means of communication, such as a payload signal passing between the radio transmitter and the radio receiver, which is an advantage.

According to one aspect, the detected data signal comprises a transmitter identification word. The transmitter identification word comprises information to identify the radio transmitter which generated the received probing signal.

By means of the identification word, a radio receiver can identify the radio transmitter which generated the received probing signal. This is advantageous because the radio receiver can use said identification word to find the correct probing signal in scenarios where many probing signals are present. Also, a radio receiver which happen to receive a strong probing signal from a radio transmitter which is not of interest can notify an operator, which can then take suitable action, e.g., to control interference on a network level.

According to an aspect, the method further comprises the step of receiving a payload signal via a payload antenna in parallel with receiving the probing signal. The payload antenna has a payload antenna receive pattern, and the payload signal is transmitted from the radio transmitter in parallel with the transmission of the probing signal using a payload antenna transmit pattern.

Thus, an obtained advantage is that the transmission and reception of the payload signal is unhindered by the transmission and reception of the probing signal. This is especially advantageous in communication systems with strict requirements on availability of the payload signal, since the transmit and receive antenna patterns used for transmission and reception of the probing signal can be modified at will without affecting the transmission and reception of the payload signal.

According to another aspect, the payload antenna and the steerable receive pattern antenna constitute the same physical antenna.

This feature of a single antenna for both probing and payload signal is advantageous in terms of installation foot-print, and ease of deployment, as well as production cost.

According to yet another aspect, the payload antenna and the steerable receive pattern antenna constitute different physical antennas. The steerable receive pattern antenna is mounted in close vicinity to the payload antenna and configured to have a reference antenna receive pattern equal to the antenna receive pattern of the payload antenna.

This is advantageous since the antenna pattern of an existing antenna, e.g., a disc antenna, can be evaluated by using an add-on unit which implements the steerable receive pattern antenna.

According to a further aspect, the method further comprises the step of comparing the probing signal quality value corresponding to the payload antenna receive pattern, or corresponding to a combination of payload antenna transmit pattern and payload antenna receive pattern, to the highest overall determined probing signal quality value. The method also comprises detecting a sub-optimal payload antenna pattern when the difference between the highest overall determined probing signal quality value and probing signal quality value corresponding to the payload antenna receive pattern, or corresponding to the combination of payload antenna transmit pattern and payload antenna receive pattern, differs by more than a pre-set threshold value.

Consequently, by the features of comparing and detecting, it becomes possible to evaluate the current antenna pattern or patterns used for transmission and reception of a payload signal, and to detect the occurrence of a sub-optimal antenna pattern, which is an advantage.

According to an aspect, the method also comprises the step of requesting manual antenna re-alignment when a sub-optimal payload antenna pattern has been detected. The step of requesting comprises transmitting an antenna re-alignment request message to an operator of the radio receiver.

Thus, advantageously, action can be taken by an operator of the communications equipment following detection of a sub-optimal antenna pattern or alignment. Also, a further benefit is obtained in that non-steerable antenna pattern antennas can be used, said non-steerable antenna pattern antennas instead being re-aligned manually upon detection of a sub-optimal antenna pattern or alignment.

According to another aspect, the payload antenna is configured to have a steerable receive pattern. Also, the method comprises the step of automatically re-aligning the steerable receive pattern of the payload antenna by steering the steerable receive pattern of the payload antenna to the receive pattern with highest determined probing signal quality value.

Consequently the transmission conditions are automatically improved without manual intervention, which is an advantage.

Thus, by the present disclosure, improvements in the system gain of, e.g., a point-to-point radio link is obtained, especially in scenarios where propagation conditions vary over time, due to improvements in payload antenna alignment.

In addition, a positive impact on the availability of NLOS point-to-point radio links is obtained, especially in a changing propagation condition environment, due to the improvements in payload antenna alignment.

The object of the present disclosure is in another embodiment obtained by a method in a radio transmitter for evaluating the transmit pattern of a directive payload antenna. The method comprises the step of generating a probing signal, and also steering the transmit pattern of the steerable transmit pattern antenna according to a pre-determined sequence of probing signal transmit patterns. The method further comprises the step of transmitting the probing signal via a steerable transmit pattern antenna.

Thus, the suitability of different antenna transmit patterns for use in radio communication in a given environment can be continuously evaluated, which is an advantage.

Another advantage is that a pre-determined sequence of probing signal transmit patterns is used. This allows a user to set the pre-determined sequence of probing signal transmit patterns to a sequence of probing signal transmit patterns which all fulfill certain conditions, i.e., which only result in transmission in a given angular range. Thus, the pre-determined sequence of probing signal transmit patterns can be set according to, e.g., governmental regulation or other objectives before deployment of the system or during operation.

Yet another advantage is that a probing signal is used for evaluation of transmit patterns, thus the evaluation can be done independently from the transmission of any other signals, such as a payload signal.

According to an aspect, the step of generating further comprises modulating the probing signal by a data signal.

By the feature of modulating the probing signal by the data signal, a communications link is enabled between the radio transmitter and a radio receiver, which is advantageous since information can now pass between the radio transmitter and the radio receiver independently of any other means of communication, such as a payload signal passing between the radio transmitter and the radio receiver. Thus, any other means of communication remains unaffected by the communications link via said data signal, which is an advantage.

According to another aspect, the data signal comprises a synchronization word indicating the start in time of the used pre-determined sequence of probing signal transmit patterns.

According to yet another aspect, the data signal comprises the currently used probing signal transmit pattern of the steerable transmit pattern antenna.

Thus, means for synchronization between radio transmitter and radio receiver of used antenna diagrams is provided independently of any other means of communication, such as a payload signal passing between the radio transmitter and the radio receiver.

According to a further aspect, the method further comprises the step of transmitting a payload signal via a payload antenna in parallel with transmitting the probing signal. The payload antenna is configured to have a payload antenna transmit pattern. The transmitted payload signal is arranged to be independent of and separated from the transmitted probing signal.

Thus, an obtained advantage is that the transmission of the payload signal is independent from, and therefore unhindered by, the transmission of the probing signal. This is especially advantageous in communication systems with strict requirements on availability of the payload signal, since the transmit antenna pattern used for transmission of the probing signal can be modified at will without affecting the transmission of the payload signal.

According to an aspect, the payload antenna and the steerable transmit pattern antenna constitute the same physical antenna.

This is advantageous in terms of installation foot-print, ease of deployment, and production cost.

According to another aspect, the payload antenna and the steerable transmit pattern antenna constitute different physical antennas. The steerable transmit pattern antenna is mounted in close vicinity to the payload antenna and configured to have a calibrated reference antenna transmit pattern equal to the antenna transmit pattern of the payload antenna.

This is advantageous since the antenna pattern of an existing antenna, e.g., a fixed pattern disc antenna, can be evaluated by using an add-on unit which implements the steerable transmit pattern antenna.

According to yet another aspect, the payload signal is transmitted in a first part of a frequency band, and the probing signal is transmitted in a second part of said frequency band.

According to a further aspect, the payload signal is transmitted in a frequency band in a first slot of a time division duplex, TDD, frame, and the probing signal is transmitted in the same frequency band in a second slot of the TDD frame.

According to an aspect, the payload is transmitted in a frequency band using a first spreading code, and the probing signal is transmitted in the same frequency band using a second spreading code.

Consequently, the payload signal and the probing signal are configured to share the same frequency band, which is an advantage in terms of, e.g., transmission licensing.

According to another aspect, the relative transmission powers of the payload signal and the probing signal are arranged to be varied based on a signal to interference and noise ratio determined by a radio receiver arranged to receive the payload signal.

Thus interference in the payload signal originating from the probing signal can be controlled, which is an advantage.

The object of the present disclosure is in a further embodiment obtained by a radio receiver comprising a steerable receive pattern antenna and a processing unit. The processing unit is arranged to steer the receive pattern of the steerable receive pattern antenna according to a pre-determined sequence of probing signal receive patterns. The radio receiver also comprises a receive unit arranged to receive a probing signal via the steerable receive pattern antenna. The processing unit is also adapted to determine a probing signal quality value from the received probing signal as a function of the steered sequence of probing signal receive patterns.

Said object is in yet another embodiment obtained by a radio transmitter comprising a steerable transmit pattern antenna, a transmit unit, and a processor unit. The processor unit is arranged to generate a probing signal, and to transmit the probing signal to the transmit unit. The transmit unit is arranged to receive the probing signal from the processor unit and to transmit the probing signal via the steerable transmit pattern antenna. The processor unit is also adapted to steer the transmit pattern of the steerable transmit pattern antenna according to a pre-determined sequence of probing signal transmit patterns.

The radio receiver and radio transmitter display advantages corresponding to the advantages already described in relation to the methods.

BRIEF DESCRIPTION OF THE DRAWINGS

Further objects, features, and advantages of the present disclosure will appear from the following detailed description, wherein some aspects of the disclosure will be described in more detail with reference to the accompanying drawings, in which.

DETAILED DESCRIPTION

Figure 1:
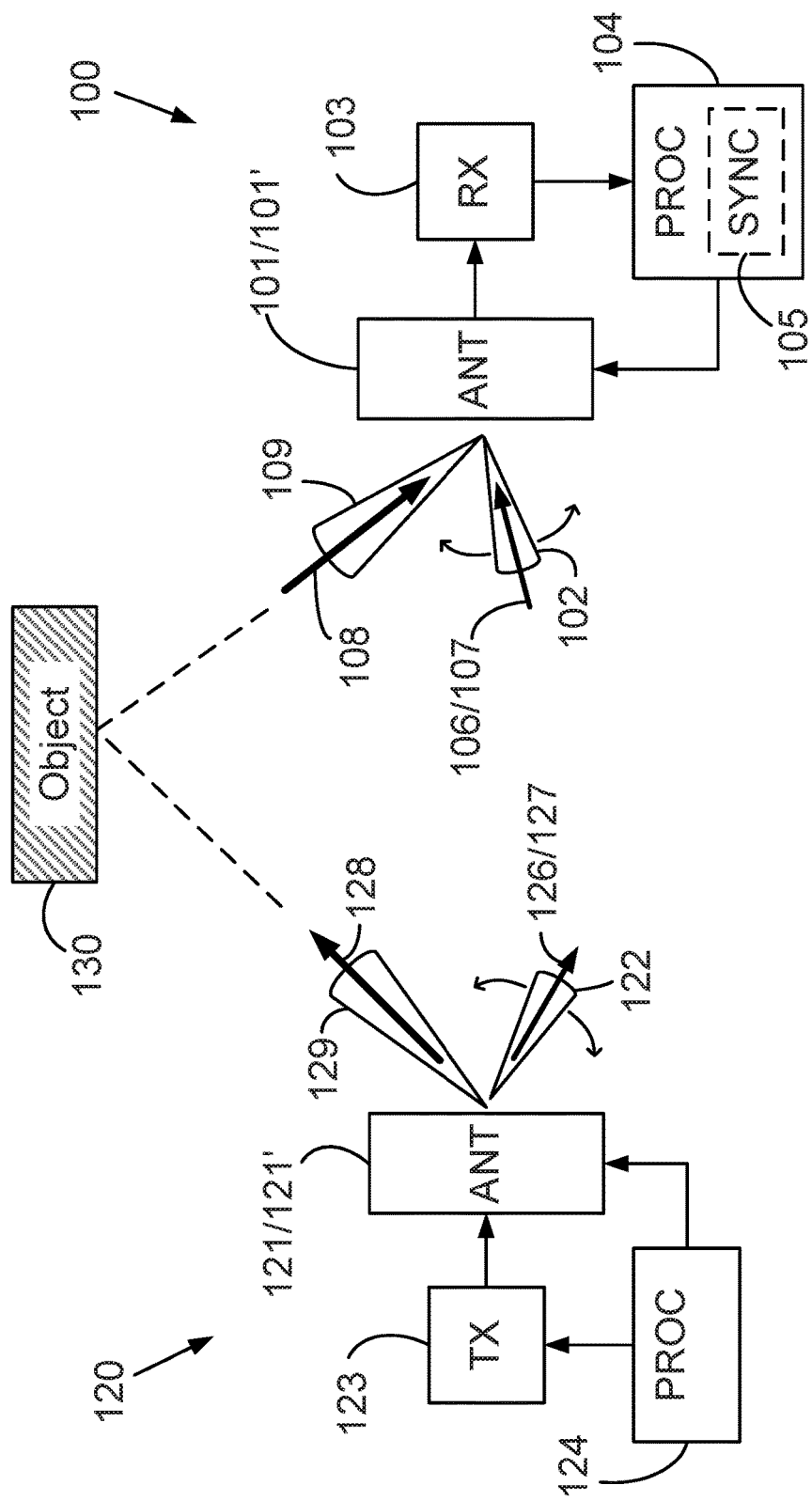
FIGS. 1-2 schematically shows embodiments of communication systems of the disclosure.

Aspects of the present disclosure will be described more fully hereinafter with reference to the accompanying drawings. The apparatus' and methods disclosed herein can, however, be realized in many different forms and should not be construed as being limited to the embodiments and aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise.

FIG. 1 shows a radio receiver 100 and a radio transmitter 120 arranged to exchange a payload signal 128, 108 and a probing signal 126, 106, possibly via indirect propagation paths via objects 130 of the environment. Such in-direct propagation paths are different from line-of-sight, LOS, propagation paths in that they involve propagation via diffraction or reflection in the environment.

The radio receiver 100 in FIG. 1 is, for the sake of clarity, shown without a corresponding radio transmitter. It should be noted that radio transceivers are generally used, i.e., a radio transmitter and a radio receiver implemented as a single entity enabling transmission and reception of radio signals from the same device. The same is true for the radio transmitter 120 shown in FIG. 1, which would in most cases be accompanied by a radio receiver to make a radio transceiver.

The radio receiver 100 comprises a steerable receive pattern antenna 101 and a processing unit 104. The processing unit 104 is arranged to steer the receive pattern 102 of the steerable receive pattern antenna 101 according to a pre-determined sequence of probing signal receive patterns. The radio receiver 100 also comprises a receive unit 103 arranged to receive the probing signal 106 via the steerable receive pattern antenna 101.

The processing unit 104 is also adapted to determine a probing signal quality value from the received probing signal as a function of the steered sequence of probing signal receive patterns. Thus, for each of the probing signal receive patterns, a probing signal quality value is determined. The used probing signal receive patterns can then be compared to each other by means of the corresponding probing signal quality values, and the pattern or patterns most suited for communication with respect to a given transmitter can be found.

In this way different propagation paths through the environment from the radio transmitter 120 to the radio receiver 100 are evaluated by means of the probing signal. The determined probing signal quality value shows, for each of the receive patterns in the pre-determined sequence of probing signal receive patterns the quality of the given receive pattern, i.e., its suitability for use in communicating from the transmitter 120 to the receiver 100 in the given environment.

Herein, the type of signal quality measure used in the signal quality value varies according to different aspects. According to one aspect the probing signal quality value comprises a signal to noise ratio, SNR, of the received probing signal. According to another aspect the probing signal quality value comprises a signal to interference and noise ratio, SINR, of the received probing signal. According to yet another aspect the probing signal quality value comprises a measure of mutual information between the radio transmitter 120 and the radio receiver 100.

According to a further aspect the probing signal quality value comprises an error rate, such as a bit error rate, BER, of a data signal modulated onto the probing signal.

The radio receiver 100 is also arranged to receive a payload signal 108 via a payload antenna 101' in parallel with receiving the probing signal 106. The payload antenna 101' has a payload antenna receive pattern 109, and the payload signal 128 is arranged to be transmitted from the radio transmitter 120 in parallel with the transmission of the probing signal 126 using a payload antenna transmit pattern 129.

Consequently, once a number of different probing signal receive patterns 109 have been evaluated in terms of probing signal quality value, a comparison can be made between the receive pattern 109 used for the payload signal 108, and the probing signal receive pattern having best determined probing signal quality value. In case the probing signal receive pattern corresponding to the receive pattern currently used for the payload signal 108 is not the best receive pattern, action can be taken to correct the payload signal receive pattern 109 in order to improve transmission conditions from the radio transmitter 120 to the radio receiver 100.

Note that in FIG. 1 the payload antenna 101' used for receiving the payload signal and the steerable receive pattern antenna 101 used for receiving the probing signal are shown as the same physical entity 101/101'. A shared antenna used for both payload signal and probing signal is also described in connection with FIGS. 2-4. However, this is not a necessity of the disclosure, as will be shown below in connection to FIG. 5, where the payload antenna 101' and the steerable receive pattern antenna 101 are implemented by different physical antennas.

Thus, by the present disclosure, improvements in the system gain of, e.g., a point-to-point radio link is obtained, especially in scenarios where propagation conditions vary over time, due to improvements in payload antenna alignment. In addition, a positive impact on the availability of NLOS point-to-point radio links is obtained, especially in a changing propagation condition environment, also due to the improvements in payload antenna alignment.

The radio transmitter 120 shown in FIG. 1 comprises a steerable transmit pattern antenna 121, a transmit unit 123, and a processor unit 124. The processor unit 124 is arranged to generate a probing signal, and to transmit the probing signal to the transmit unit 123. The transmit unit 123 is arranged to receive the probing signal from the processor unit 124 and to transmit the probing signal 126 via the steerable transmit pattern antenna 121. The processor unit 124 is also adapted to steer the transmit pattern 122 of the steerable transmit pattern antenna 121 according to a pre-determined sequence of probing signal transmit patterns.

Thus, in much the same way as the radio receiver 100 evaluates different probing signal receive patterns 102, the radio transmitter 120 varies the probing signal transmit patterns 122 and thus enables evaluation of different transmit antenna patterns, or evaluation of combinations of transmit and receive antenna patterns, for use in a given environment.

The radio transmitter 120 shown in FIG. 1 also comprises a payload antenna 121' used for transmission of a payload signal 128. The payload antenna 121' having a transmit antenna pattern 129. The steerable transmit pattern antenna 121 used for transmitting the probing signal and the payload antenna 121' are in FIG. 1 shown as the same physical entity 121/121'. This is not a necessity of the disclosure, as will be shown below in connection to FIG. 5, where the payload antenna 121' and the steerable transmit pattern antenna 121 are implemented by different physical antennas.

According to an aspect, the processor unit 104 of the radio receiver 100 comprises a synchronization module 105. The synchronization module 105 is configured to synchronize in time the pre-determined sequence of probing signal transmit patterns which is used and the pre-determined sequence of probing signal receive patterns which is used. Consequently, at any given time instant, the processor unit 104 of the radio receiver 100 is by the synchronization module 105 aware of the combination of probing signal transmit pattern 126 and the probing signal receive pattern 102 currently in use. In this way, the processor unit 104 is arranged to determine probing signal quality values for combinations of probing signal transmit patterns 122 and probing signal receive patterns 102.

The synchronization module 105 is according to one aspect arranged to demodulate the received probing signal 106 and detect a data signal 107, 127 which has been modulated onto the transmitted probing signal 126 by the radio transmitter 120. The data signal 107, 127 is according to one aspect the carrier of a unique synchronization word which signifies the start of the pre-determined sequence of probing signal transmit patterns. The probing signal is according to another aspect modulated by the data signal to carry the currently used probing signal transmit pattern. Thus the radio receiver 100 is made aware of the currently used probing signal transmit pattern, in addition to the currently used probing signal receive pattern, and can therefore determine a probing signal quality metric corresponding to a combination of probing signal transmit and probing signal receiver patterns.

According to one aspect the detected data signal comprises a transmitter identification word. The transmitter identification word in turn comprises information to identify the radio transmitter which generated the received probing signal. Examples of such identification words can be, e.g., the MAC address or IP address of the transmitter station, or simply a unique word which identifies the radio transmitter in a set of radio transmitters.

By means of the identification word, a radio receiver can identify the radio transmitter which generated the received probing signal. This enables the radio receiver find the correct probing signal in scenarios where many probing signals are present. Also, a radio receiver which happen to receive a strong probing signal from a radio transmitter which is not of interest, i.e., with which the receiver does not want to communicate, can notify an operator which in turn can then take suitable action, e.g., to control interference in the network.

According to an alternative, the receive unit 103 is arranged to demodulate the received probing signal 106 and detect the data signal 107, 127 which has been modulated onto the transmitted probing signal 126 by the radio transmitter 120. The synchronization module 105 is then arranged to receive the information comprised in the data signal from the receive unit 103.

According to an aspect, a calibration is performed upon deployment of the communication system in order to establish a unique relationship in terms of at least directivity, i.e., direction of a main antenna beam, between the probing signal receive pattern and the receive pattern of the payload antenna.

It is noted that the transmit 122, 129 and receive 102, 109 patterns of the antennas 121/121', 101/101' shown in FIG. 1 are shown as single beam antenna patterns. Alternatives to such single beam patterns certainly exist. Thus, according to aspects, said pre-determined sequences of probing signal transmit and receive patterns comprises single or multiple beam antenna patterns with varying beam width, and double or multiple beam antenna patterns where each of the beams are varied both in direction and in width over the sequence, and also randomized antenna patterns, i.e., more general antenna patterns without any distinct beams.

In other words, according to one aspect, an adjustable beam antenna arrangement is used to continuously optimize the antenna beam width in addition to its direction in order to maximize radio link capacity. This is advantageous since, on some occasions a wide beam is suitable while during other circumstances a narrow beam yields better performance.

Thus, by the present disclosure, improvements in the system gain of, e.g., a point-to-point radio link is obtained, especially in scenarios where propagation conditions vary over time, due to improvements in payload antenna alignment. In addition, a positive impact on the availability of NLOS point-to-point radio links is obtained, especially in a changing propagation condition environment, also due to the improvements in payload antenna alignment.

Figure 2:
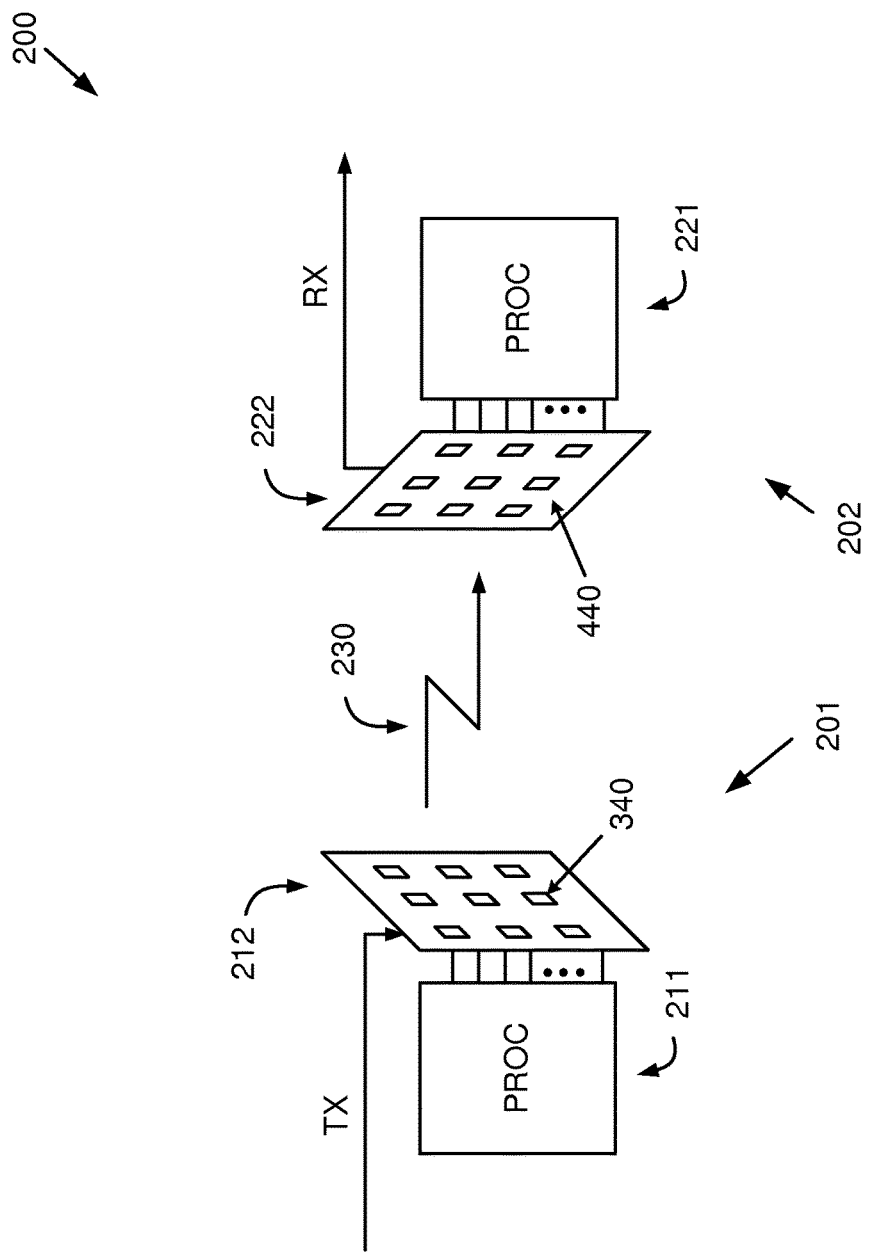

FIG. 2 shows a point-to-point radio link communication system 200. The radio link transceivers 201, 202 are equipped with steerable antenna arrays, i.e., steerable receive 222 and transmit 212 pattern antennas which can be used to continuously monitor propagation conditions of the radio link in order to detect and possibly respond to a sub-optimal antenna alignment.

According to one aspect, the steerable transmit and receive pattern antennas are used only as sensors, which sensors are used by processor units 211, 221 at both ends of the radio link to probe the communication channel in order to judge whether the alignment of a payload antenna, not explicitly shown in FIG. 2, is suitable, or whether a better alignment exists. In this case a manual antenna re-alignment of the payload antenna is requested when a sufficiently large system gain can be expected from such a re-alignment.

According to another aspect the antenna arrays 212, 222 are also used for radio link payload transmission over the hop of a payload signal. According to this aspect the transmitter 201 and receiver 202 are arranged to automatically re-align antennas, i.e., to automatically adapt the transmit pattern and receive pattern used for transmission and reception of the payload signal, in order to adapt to the most, or to a more, favorable antenna alignment as propagation conditions vary over time.

FIG. 2 shows steerable antenna arrays 212, 222, which steerable antenna arrays 212, 222 comprise a number of individual antenna elements 340, 440. It is by control of these individual antenna elements 340, 440, that different antenna patterns are generated by the steerable antenna arrays.

Figure 3:
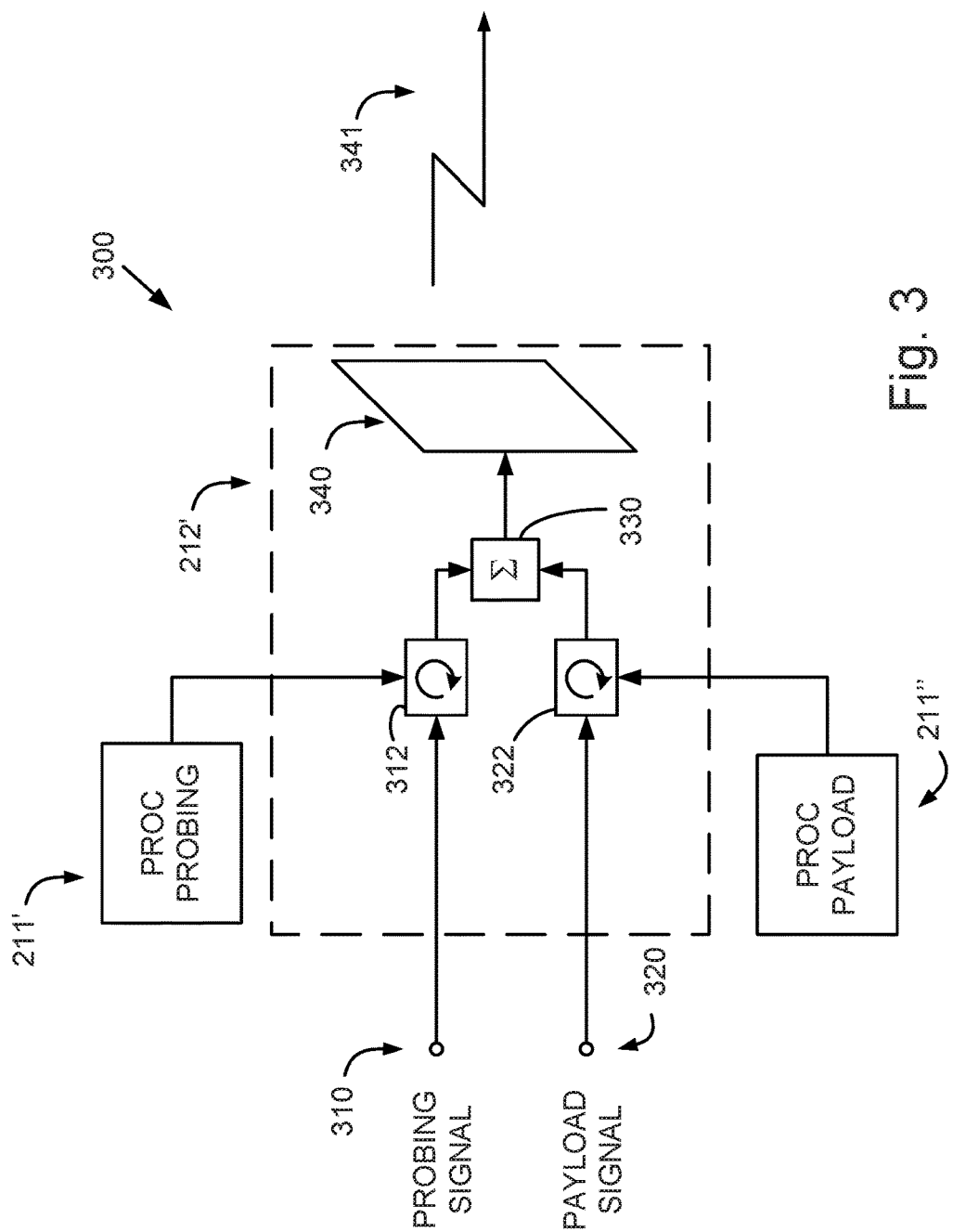
FIG. 3 is a block diagram showing details of a transmitter of the disclosure.

FIG. 3 shows one such individual antenna element 340 arranged to be used as part of a steerable antenna array 212 for transmission.

Figure 4:
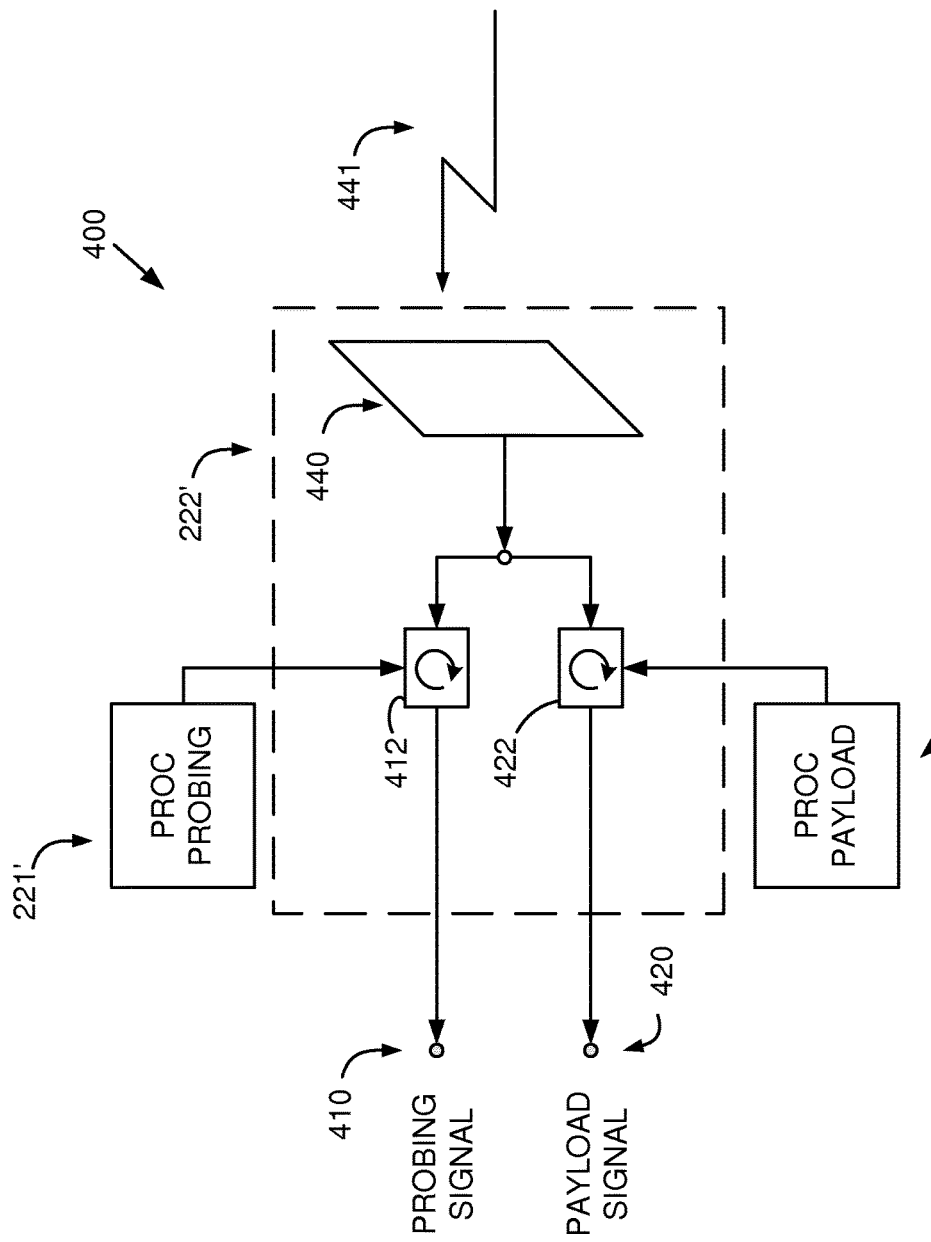
FIG. 4 is a block diagram showing details of a receiver of the disclosure.

FIG. 4 shows one such individual antenna element 440 arranged to be used as part of a steerable antenna array 222 for reception.

According to aspects, at least two types of signals pass over the radio hop 230 from transmitter 201 to receiver 202, one payload signal and one probing signal. The payload signal is transmitted using a first phase steering value of the antenna array 212, while the probing signal is transmitted using a second set of antenna array steering coefficients, as shown in FIG. 3, where a single array element 340 out of the plurality of antenna array elements is shown. Hence, the antenna patterns for the payload signal and the probing signal can be controlled independently of each other while still being arranged to be transmitted in parallel over the air 341.

Thus, FIG. 3 shows details 300 of an embodiment of a radio transmitter 201, in particular ports for receiving 310 the probing signal and for receiving 320 the payload signal are shown. The probing signal and the payload signal are then arranged to be subjected to different phase shifts via a probing signal phase shifter 312 and a payload signal phase shifter 322. The probing signal phase shifter 312 and the payload signal phase shifter 322 are arranged to be steered by the processor unit 211, here shown as a probing signal processor module 211' and a payload signal processor module 211".

The summation unit 330 shown in FIG. 3 is according to an aspect implemented by a directional coupler.

The payload signal and probing signal are transmitted 341 from the same antenna element 340.

FIG. 4 shows details 400 of an embodiment of a radio receiver 202, in particular output ports 410, 420 for outputting a received probing signal and for outputting a received payload signal, respectively, are shown. The probing and the payload signal 441 are arranged to be received by an antenna element 440 and then subjected to different phase shifts via a probing signal phase shifter 412 and a payload signal phase shifter 422, respectively. The probing signal phase shifter 412 and the payload signal phase shifter 422 are arranged to be steered by the processor unit 221, here shown as a probing signal processor module 221' and a payload signal processor module 221".

It is noted that transmit and receive functions in a communication system are often incorporated in the same physical antenna, i.e., an antenna adapted to transmit and receive at the same time, used by a transceiver device.

The probing signal and the payload signal are, according to aspects, separated from each other in order not to interfere with each other. Also, since the probing signal preferably should not be allowed to consume more resources of a communications resource such as a radio link licensed frequency band, than are freely available, due to, e.g., a traffic flow below the currently required capacity of a radio link.

Thus, according to a first aspect, separation between payload and probing signal is achieved by reservation of a variable width frequency sub-band for the probing signal. The width of the frequency sub-band depending on traffic load carried by the payload signal.

According to a second aspect separation between payload and probing signal is achieved by synchronizing radio transmitter and radio receiver in time in order to enable time division duplex, TDD, transmission, and reserving a variable amount of transmission time for the probing signal as a function of traffic flow.

According to a third aspect separation between payload and probing signal is achieved by use of different spreading codes for payload signal and probing signal. The allocated transmission power of the probing signal compared to the payload signal suitably being a function of the traffic load, i.e., using a large probing signal power at low traffic load and vice versa.

Since the amount of communications resources consumed by the probing signal relative to the communications resources consumed by the payload signal is according to aspects set as a function of the current traffic load, the total symbol energy of the payload signal will, according to aspects, vary over time. In order to account for this and maintain a constant probing signal symbol energy, the probing signal can be modulated using a PN sequence of variable length. Hence, a short length (short repeat time duration) is used when large resources are available, and a larger length (long repeat time duration) is used when communications resources are scarce.

According to one aspect, in case a spread spectrum type of separation system is used, power control of the probing signal is used in order not to interfere excessively with the payload signal. According to an alternative the power of the probing signal is set in order to maintain a constant pre defined signal to noise ratio (SNR) or mean squared error (MSE) of the payload signal as received at the radio receiver. In this way, the headroom given by a current SNR is used for probing of the channel by the probing signal.

According to one aspect, receiving of the payload signal is arranged to be performed in parallel with receiving the probing signal. Also, the payload signal is independent of and separated from the probing signal as was discussed above.

It is an advantage that the probing signal is independent of the payload signal since full freedom can be assigned to operation of the probing signal during probing without risk of adversely affecting the usage of the payload signal. Since the probing signal is separated from the payload signal the probing signal can be altered at will with no change in the payload signal, which is an advantage. Also, an already existing communication system arranged for transmission and reception of the payload signal can be re-used and upgraded to be able to transmit and receive also the probing signal.

By changing the antenna array steering coefficients of an antenna array, a range of transmit directions and receive directions can be obtained. According to one aspect, the radio transmitter 201 uses a single antenna beam of given width and steps through a transmission angle (elevation and azimuth) range in a pre-determined order and with pre-determined step size, while the radio receiver 202 also uses a single antenna beam of given width and steps through a pre-determined receive angle (elevation azimuth) range in a pre-determined order and with pre-determined step size, one cycle for each transmission angle. The radio receiver 202 can then determine the probing signal quality value, e.g., a received signal power or energy of the probing signal for each transmit-receive angle configuration, and thus determine a suitable antenna alignment given current propagation conditions.

According to one aspect, and as noted above, the radio transmitter 201 is arranged to modulate the probing signal with a data signal in order to communicate the current output transmission angle (e.g., elevation and azimuth) to the radio receiver 202, which information is carried by said data signal. This way the radio receiver 202 is arranged to obtain the information needed to discern which angle of transmission (elevation and azimuth), i.e., the probing signal transmit pattern, is currently being used by the radio transmitter 201.

The radio receiver for the probing signal is according to one aspect implemented by a correlator architecture matched to the transmitted probing signal.

According to aspects where the radio receiver structure is of low complexity, the power of the received probing signal is used to determine which transmit-receive angle pair, i.e., the combination of probing signal transmit and probing signal receive pattern, is optimal in terms of probing signal quality value.

As noted above, In a more advanced radio receiver structure other performance metrics can be used as probing signal quality value, e.g., mutual information between transmitter and receiver, MSE, BER, or similar performance metrics.

Figure 5:
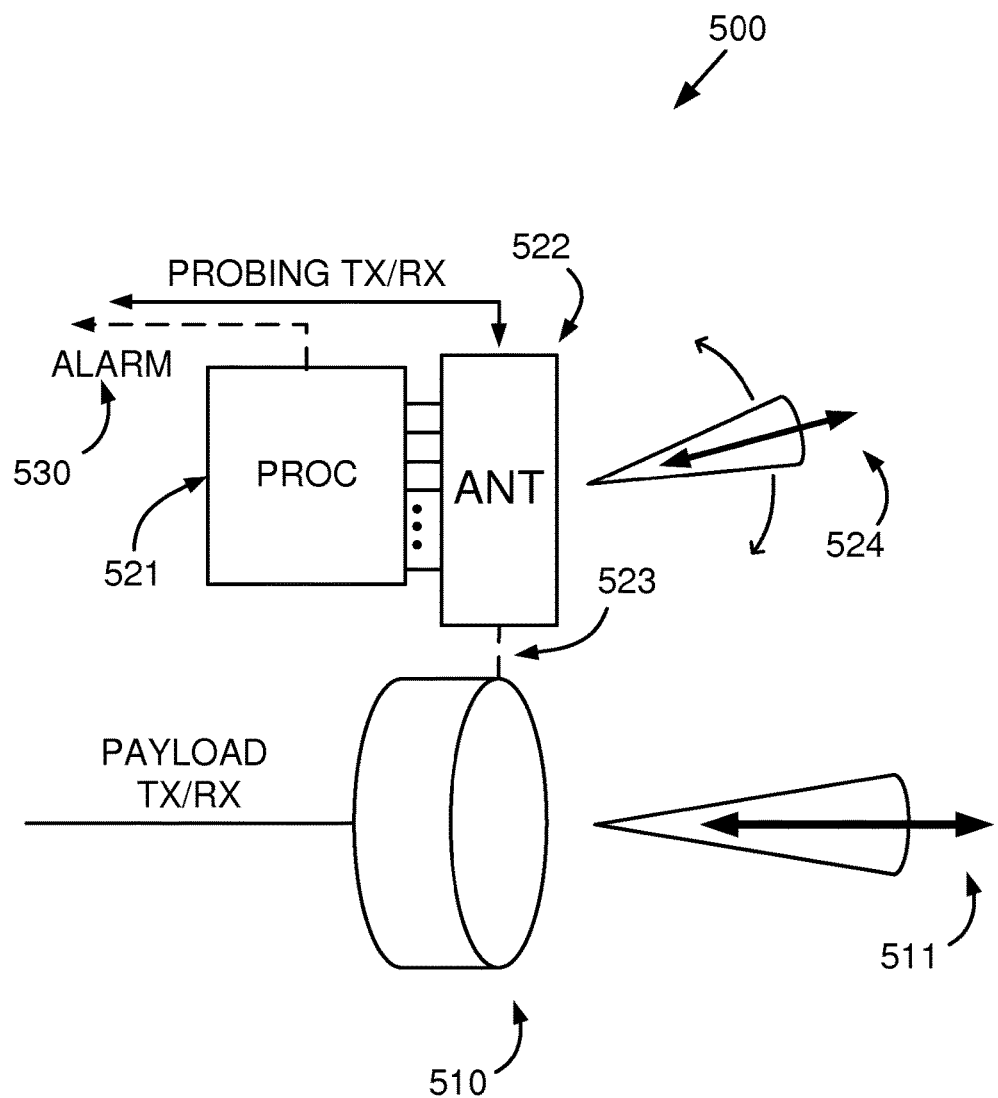
FIG. 5 shows an embodiment of a transceiver of the disclosure.

FIG. 5 shows a transceiver 500 arranged for parallel transmission and reception of the probing signal 524 and of the payload signal 511, but where separate antennas 510, 522, are used for the probing signal 524 and for the payload signal 511. Thus, a payload antenna 510 is used for transmission and reception of payload signals, and a probing signal antenna 522 is used for transmission and reception of probing signals.

According to one aspect of the transceiver 500 shown in FIG. 5, the probing signal antenna 522 constitutes a low-cost antenna array configured as an add-on antenna to the payload antenna 510. The probing signal antenna 522 is here an add-on antenna used to continuously evaluate the optimality of the payload antenna alignment, i.e., the transmit and receive pattern of the main payload antenna 510.

According to another aspect, the probing signal antenna 522 constitutes a disc antenna with transmit and receive antenna patterns arranged to be steered mechanically by a processor unit 521.

According to yet another aspect, the probing signal antenna 522 constitutes a disc antenna with transmit and receive antenna patterns arranged to be steered manually by an operator.

According to one aspect, the probing signal antenna 522 is rigidly connected 523 to the main antenna.

According to another aspect, the probing signal antenna 522 is disposed in connection to the payload antenna 510 and calibrated together with the payload antenna 510, meaning that a comparison between the optimal alignment of the probing signal antenna 522 and the current alignment of the payload antenna 510 can be made by the processor unit 521.

According to yet another aspect, an alarm signal 530 is generated by a processor unit 521 configured to steer the probing signal antenna 522 and transmitted via, e.g., a backhaul network to a system operator or maintenance person in case optimal alignment of the payload antenna 510 deviates from current alignment of the payload antenna 510 by more than a pre-determined threshold value.

According to one aspect, the present disclosure is applied in an NLOS point-to-point radio link application with single beam disc antennas, which single beam disc antennas are used for payload transmission between a radio transmitter 120 and a radio receiver 100, i.e., an NLOS point-to-point radio link. According to this aspect the probing signal 126/106 is transmitted and received using steerable receive/transmit pattern antennas which are physically different from the disc antennas used for payload transmission. The evaluation of probing signal antenna patterns amounts in this case to finding a single suitable NLOS propagation path from radio transmitter 120 to radio receiver 100 via, e.g., reflection or diffraction in the propagation environment 130.

Figure 6:
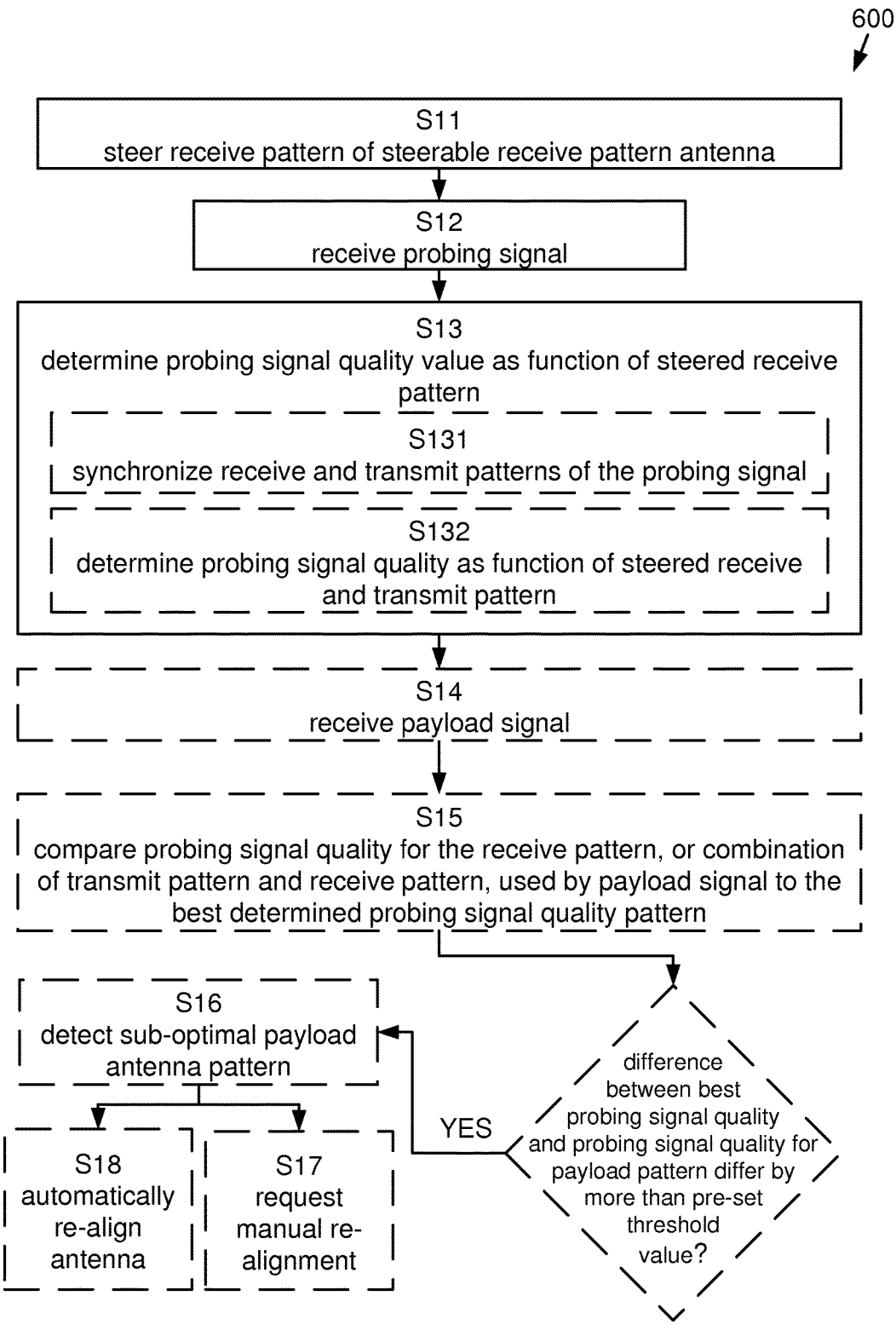
FIGS. 6-7 are flowcharts illustrating embodiments of methods of the disclosure.

FIG. 6 shows a method 600 in a radio receiver 100 for evaluating the receive pattern 109 of a directive payload antenna. The method 600 comprises the steps of steering S11 a probing signal receive pattern 102 of a steerable receive pattern antenna 101 according to a pre-determined sequence of probing signal receive patterns, and receiving S12 a probing signal 106 via the steerable receive pattern antenna 101, as well as determining S13 a probing signal quality value from the received probing signal 106 as a function of the pre-determined sequence of probing signal receive patterns.

An example of executing the method described above and shown in FIG. 6 was described in connection to FIG. 1, where a radio receiver 100 is shown. By the features of steering S11 a probing signal receive pattern 102 and receiving S12 a probing signal it becomes possible to evaluate how different probing signal receive patterns, e.g., different antenna beam widths or directions (elevation and azimuth), behave in terms of, e.g., received probing signal power. In this way the method can be used to map a sequence of pre-determined probing signal receive patterns to corresponding probing signal quality values.

Thus, the suitability of different antenna receive patterns for use in radio communication in a given environment can be continuously evaluated, which is an advantage.

Another advantage, as mentioned above, is that a pre-determined sequence of probing signal receive patterns is used, which allows a setting of said pre-determined sequence of probing signal receive patterns according to, e.g., governmental regulation or other objectives before deployment of the system or during operation.

Yet another advantage is that a probing signal is used for evaluation of receive patterns, thus the evaluation can be done independently from reception of other signals, such as a payload signal.

According to one aspect, the step of determining S13 also comprises synchronizing S131 the steered sequence of probing signal receive patterns to a predetermined sequence of probing signal transmit patterns used for transmission of the probing signal 126 by a radio transmitter 120. Also, the step of determining S13 also comprises determining S132 a probing signal quality value from the received probing signal 106 as a function of a combination of probing signal transmit 122 and receive 102 patterns.

Examples of implementing the step of synchronizing S131, including aspects, have been given in connection to FIG. 1 above, where the synchronization module 105 shown in FIG. 1 is described.

According to another aspect, the step of synchronizing S131 comprises detecting a data signal 127, 107 comprised in the probing signal 126, 106 by demodulating the received probing signal 106.

According to yet another aspect, the detected data signal comprises a synchronization word indicating the start in time of the sequence of probing signal transmit patterns used by the radio transmitter 120.

According to a further aspect, the detected data signal comprises the probing signal transmit pattern 122 currently used for transmission of the probing signal 126 by the radio transmitter 120.

Examples of the implementation of the step of synchronizing S131, including aspects thereof, have been given in connection to FIG. 1 above, where the synchronization module 105 shown in FIG. 1 is described.

According to one aspect, the method 600 further comprises the step of receiving S14 a payload signal 108 via a payload antenna 101' in parallel with receiving the probing signal 106. The payload antenna 101' has a payload antenna receive pattern 109. The payload signal 128 is transmitted from the radio transmitter 120 in parallel with the transmission of the probing signal 126 using a payload antenna transmit pattern 129.

According to another aspect, the payload antenna 101' and the steerable receive pattern antenna 101 constitute the same physical antenna 222.

An example of payload antenna and steerable receive pattern antenna implemented by the same physical antenna was shown and described in connection to FIGS. 2-4. Here, according to aspects, a single antenna array was used for both payload and probing signal.

According to yet another aspect, the payload antenna 510 and the steerable receive pattern antenna 522 constitute different physical antennas. The steerable receive pattern antenna 522 is mounted 523 in close vicinity to the payload antenna 510 and configured to have a calibrated antenna receive pattern equal to the antenna receive pattern of the payload antenna 510.

An example of separate payload and steerable receive pattern antennas was shown and described in connection to FIG. 5. Here, according to aspects, an antenna array was used for the probing signal, while another antenna was used for the payload signal. According to an aspect in a point-to-point radio link application, the antenna used for payload signal is a disc antenna which must be manually re-aligned in order to change directivity.

In other words, and according to another aspect, the method 600 comprises the step of requesting S17 manual antenna re-alignment when a sub-optimal payload antenna pattern has been detected. The step of requesting S17 further comprises transmitting an antenna re-alignment request message to an operator of the radio receiver 100.

According to an aspect, the method 600 also comprises the step of comparing S15 the probing signal quality value corresponding to the payload antenna receive pattern 109, or corresponding to a combination of payload antenna transmit pattern 129 and payload antenna receive pattern 109, to the highest overall determined probing signal quality value.

According to one aspect the probing signal quality value comprises a signal to noise ratio, SNR, of the received probing signal. According to another aspect the probing signal quality value comprises a signal to interference and noise ratio, SINR, of the received probing signal. According to yet another aspect the probing signal quality value comprises a measure of mutual information between the radio transmitter 120 and the radio receiver 100. According to a further aspect the probing signal quality value comprises an error rate, such as a bit error rate, BER, of a data signal modulated onto the probing signal.

The method 600 also comprises detecting S16 a sub-optimal payload antenna pattern when the difference between the highest overall determined probing signal quality value and probing signal quality value corresponding to the payload antenna receive pattern 109, or corresponding to the combination of payload antenna transmit pattern 129 and payload antenna receive pattern 109, differs by more than a pre-set threshold value.

Said threshold value is, according to an aspect, set based on requirements on payload transmission. Thus, even if the currently used payload transmit and receive pattern is not optimal, performance may be sufficient for meeting requirements. In this case no re-alignment may be necessary. In this way re-aligning unnecessarily often is avoided, which is an advantage.

According to yet another aspect, the payload antenna is configured to have a steerable receive pattern, and the method 600 further comprises the step of automatically re-aligning S18 the steerable receive pattern of the payload antenna by steering the steerable receive pattern of the payload antenna to the receive pattern with highest determined probing signal quality value.

Figure 7:
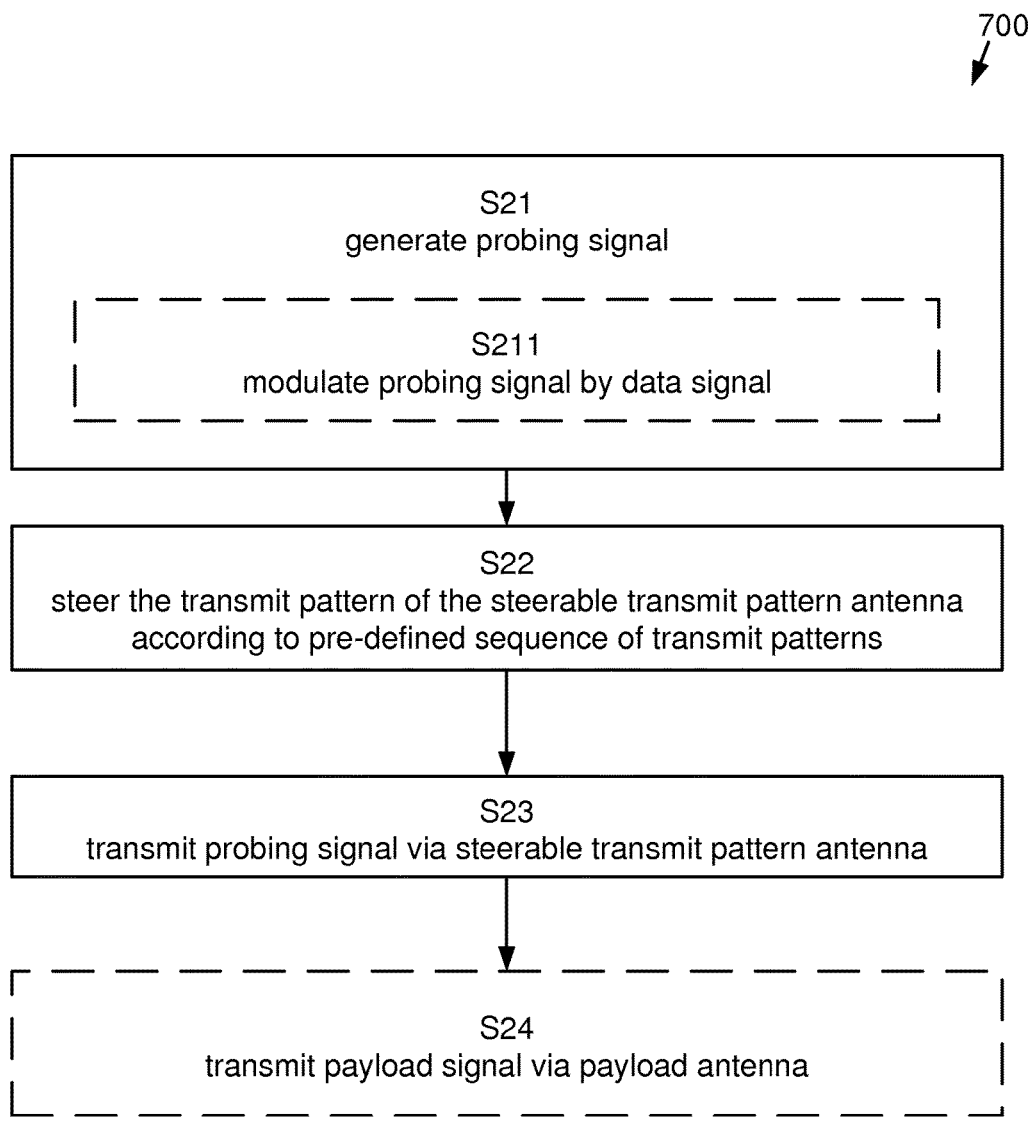

FIG. 7 shows a method 700 in a radio transmitter 120 for evaluating the transmit pattern 129 of a directive payload antenna. The method 700 comprises the steps of generating S21 a probing signal, and steering S22 the transmit pattern 122 of the steerable transmit pattern antenna 121 according to a pre-determined sequence of probing signal transmit patterns, and transmitting S23 the probing signal 126 via a steerable transmit pattern antenna 121.

One example of executing the method shown in FIG. 7 has been described in connection to FIG. 1, where a radio transmitter 120 is shown.

According to one aspect, the step of generating S21 further comprises modulating S211 the probing signal 126 by a data signal 127.

According to another aspect, the data signal 127 comprises a synchronization word indicating the start in time of the used pre-determined sequence of probing signal transmit patterns.

According to yet another aspect, the data signal 127 comprises the currently used probing signal transmit pattern 122 of the steerable transmit pattern antenna 121.

As has been discussed above, the features relating to the data signal enable an evaluation of the merits of combinations of transmit and receive antenna patterns.

According to a further aspect, the method 700 also comprises the step of transmitting S24 a payload signal 128 via a payload antenna 121' in parallel with transmitting the probing signal 126. The payload antenna 121' is configured to have a payload antenna transmit pattern 129.

According to one aspect, the payload antenna 121' and the steerable transmit pattern antenna 121 constitute the same physical antenna 212.

An example of such a shared antenna set-up was shown in FIG. 2, and discussed in connection to FIG. 2.

According to another aspect, the payload antenna 510 and the steerable transmit pattern antenna 522 constitute different physical antennas. The steerable transmit pattern antenna 522 is mounted 523 in close vicinity to the payload antenna 510 and configured to have a calibrated reference antenna transmit pattern equal to the antenna transmit pattern of the payload antenna 510.

An example of such an antenna set-up with different antennas for the probing signal and for the payload signal was shown in FIG. 5, and discussed in connection to FIG. 5.

According to yet another aspect, the payload signal 128 is transmitted in a first part of a frequency band, and the probing signal 126 is transmitted in a second part of said frequency band.

According to another aspect, the payload signal 128 is transmitted in a first slot of a time division duplex, TDD, frame, and the probing signal 126 is transmitted in a second slot of the TDD frame.

According to another aspect, the payload signal 128 is transmitted using a first spreading code, and the probing signal 126 is transmitted using a second spreading code.

According to a further aspect, the relative transmission powers of the payload signal 128 and the probing signal 126 are arranged to be varied based on a signal to interference and noise ratio determined by a radio receiver 100 arranged to receive the payload signal 108.

Consequently, the probing signal and the payload signal are separated from each other in order not to interfere with each other.

In a communications system the traffic load, i.e., the information quantity which is carried by the payload signal, often vary over time. Given that a fixed amount of bandwidth is often available to the communication system, the probing signal is, according to an aspect, only allowed to consume resources not needed by the payload signal. The various aspects for separating payload signal and probing signal detailed above then has the further benefit of allowing dynamic resource allocation between payload signal and probing signal. Thus, when traffic load is high, only a very little resources are used up by the probing signal, while, during times when traffic load is low, the probing signal is allowed to consume more resources.

Adaptive modulation is a technique which adapts a modulation format to match current transmission conditions. When transmission conditions are favorable, e.g., in terms of SNR, a high spectral efficiency modulation format is used which increases throughput. When transmission conditions are not favorable, a lower spectral efficiency modulation format is used which increases resilience to interference and noise. Communication systems which implement adaptive modulation therefore benefits from an increased spectral efficiency when transmission conditions are good, i.e., during clear sky conditions, and are at the same time resilient to interference and noise when transmission conditions are degraded.

Adaptive modulation can advantageously be combined with the dynamic resource allocation between payload signal and probing signal discussed above. When traffic load is high, adaptive modulation is, according to aspects, used to maximize spectral efficiency of the payload signal, at times leaving only a limited amount of communications resources to be consumed by the probing signal. However, when traffic load is low, adaptive modulation is used to reduce spectral efficiency of the payload signal in order to increase the resilience to interference and noise of the payload signal transmission. This allows more communications resources to be consumed by the probing signal, especially in a scenario where payload signal and probing signal are separated by means of spreading codes.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

The invention claimed is:

1. A method in a radio receiver for identifying one or more suitable probing signal receive patterns, the method comprising the steps of:
   steering a probing signal receive pattern of a steerable receive pattern antenna according to a pre-determined sequence of probing signal receive patterns;
   receiving a probing signal via the steerable receive pattern antenna;

determining a probing signal quality value from the received probing signal as a function of the pre-determined sequence of probing signal receive patterns; and identifying, by the radio receiver, the one or more suitable probing signal receive patterns based on the determined probing signal quality value.

2. The method according to claim 1, further comprising the step of receiving via a directive payload antenna a payload signal in parallel with the receiving of the probing signal, the payload signal being independent of and separated from the probing signal.

3. The method according to claim 2, wherein the directive payload antenna is configured according to a payload antenna receive pattern, the payload signal being transmitted from a radio transmitter in parallel with a transmission of the probing signal using a payload antenna transmit pattern.

4. The method according to claim 3, wherein the directive payload antenna and the steerable receive pattern antenna constitute the same physical antenna.

5. The method according to claim 3, wherein the directive payload antenna and the steerable receive pattern antenna constitute different physical antennas, the steerable receive pattern antenna being mounted in close vicinity to the directive payload antenna and configured to have a calibrated antenna receive pattern equal to the payload antenna receive pattern of the directive payload antenna.

6. The method according to claim 3, further comprising the steps of:
comparing the probing signal quality value corresponding to the payload antenna receive pattern, or corresponding to a combination of the payload antenna transmit pattern and the payload antenna receive pattern, to a highest overall determined probing signal quality value; and
detecting a sub-optimal payload antenna receive pattern when the difference between the highest overall determined probing signal quality value and the probing signal quality value corresponding to the payload antenna receive pattern, or corresponding to the combination of the payload antenna transmit pattern and the payload antenna receive pattern, differs by more than a pre-set threshold value.

7. The method according to claim 6, further comprising the step of requesting manual antenna re-alignment when the sub-optimal payload antenna receive pattern has been detected, the step of requesting comprising transmitting an antenna re-alignment request message to an operator of the radio receiver.

8. The method according to claim 3, wherein the directive payload antenna is configured according to a steerable receive pattern, the method further comprising the step of automatically re-aligning the steerable receive pattern of the directive payload antenna by steering the steerable receive pattern of the directive payload antenna to the payload antenna receive pattern with a highest overall determined probing signal quality value.

9. The method according to claim 1, wherein:
the step of determining further comprises synchronizing a steered sequence of probing signal receive patterns to a pre-determined sequence of probing signal transmit patterns used for transmission of the probing signal by a radio transmitter, and
the step of determining the probing signal quality value from the received probing signal is a function of a combination of the pre-determined sequence of probing signal transmit patterns and the pre-determined sequence of probing signal receive patterns.

10. The method according to claim 9, wherein the step of synchronizing comprises detecting a data signal comprised in the probing signal by demodulating the received probing signal.

11. The method according to claim 10, wherein the detected data signal comprises a synchronization word indicating the start in time of the pre-determined sequence of probing signal transmit patterns used by the radio transmitter.

12. The method according to claim 10, wherein the detected data signal comprises a radio transmitter identification word, the radio transmitter identification word comprising information sufficient to identify the radio transmitter which generated the received probing signal.

13. The method according to claim 10, wherein the detected data signal comprises the probing signal transmit pattern used for the transmission of the probing signal by the radio transmitter.

14. A method in a radio transmitter for identifying one or more suitable probing signal transmit patterns, the method comprising the steps of:
generating, via a processor of the radio transmitter, a probing signal;
steering, via the processor, a probing signal transmit pattern of a steerable transmit pattern antenna according to a pre-determined sequence of probing signal transmit patterns; and
transmitting the probing signal via the steerable transmit pattern antenna to identify the one or more suitable probing signal transmit patterns.

15. The method according to claim 14, further comprising the step of transmitting a payload signal via a directive payload antenna in parallel with the transmitting of the probing signal, the directive payload antenna being configured according to a payload antenna transmit pattern, the transmitted payload signal being arranged to be independent of and separated from the transmitted probing signal.

16. The method according to claim 15, wherein the directive payload antenna and the steerable transmit pattern antenna constitute the same physical antenna.

17. The method according to claim 15, wherein the directive payload antenna and the steerable transmit pattern antenna constitute different physical antennas, the steerable transmit pattern antenna being mounted in close vicinity to the directive payload antenna and configured to have a calibrated reference antenna transmit pattern equal to the payload antenna transmit pattern of the directive payload antenna.

18. The method according to claim 15, wherein the payload signal is transmitted in a first part of a frequency band, and the probing signal is transmitted in a second part of said frequency band.

19. The method according to claim 15, wherein the payload signal is transmitted in a first slot of a time division duplex (TDD) frame, and the probing signal is transmitted in a second slot of the TDD frame.

20. The method according to claim 15, wherein the payload signal is transmitted using a first spreading code, and the probing signal is transmitted using a second spreading code.

21. The method according to claim 15, wherein relative transmission powers of the payload signal and the probing signal are arranged to be varied based on a signal to interference and noise ratio determined by a radio receiver arranged to receive the payload signal.

22. The method according to claim 14, wherein the step of generating the probing signal further comprises modulating the probing signal by a data signal.

23. The method according to claim 22, wherein the data signal comprises a synchronization word indicating the start in time of the pre-determined sequence of probing signal transmit patterns.

24. The method according to claim 22, wherein the data signal comprises a currently used probing signal transmit pattern of the steerable transmit pattern antenna.

25. The method according to claim 22, wherein the data signal comprises a radio transmitter identification word, the radio transmitter identification word comprising information sufficient to identify the radio transmitter.

26. A radio receiver, the radio receiver comprising:
a steerable receive pattern antenna;
a processor, the processor being arranged to steer a probing signal receive pattern of the steerable receive pattern antenna according to a pre-determined sequence of probing signal receive patterns; and
a receiver arranged to receive a probing signal via the steerable receive pattern antenna;
wherein the processor further being adapted to determine a probing signal quality value from the received probing signal as a function of the pre-determined sequence of probing signal receive patterns and identify one or more suitable probing signal receive patterns based on the determined probing signal quality value.

27. A radio transmitter, the radio transmitter comprising:
a steerable transmit pattern antenna;
a transmitter; and
a processor arranged to generate a probing signal, and to transmit the probing signal to the transmitter,
wherein, the transmitter arranged to receive the probing signal from the processor and to transmit the probing signal via the steerable transmit pattern antenna, and
wherein, the processor further adapted to steer a probing signal transmit pattern of the steerable transmit pattern antenna according to a pre-determined sequence of probing signal transmit patterns to identify one or more suitable probing signal transmit patterns.

* * * * *